Patented Sept. 19, 1950

2,522,676

UNITED STATES PATENT OFFICE 2,522,676

DEHYDROGENATION OF ALCOHOLS WITH SULFUR

Aaron W. Horton, Hamden, Conn., assignor to Socony-Vacuum Oil Company, Incorporated, a corporation of New York No Drawing. Application June 19, 1947, Serial No. 755,731

9 Claims. (Cl. 260—495)

This invention relates to the dehydrogenation of primary alcohols by reaction with sulphur and more particularly to the formation of esters from primary alcohols by the use of sulphur.

The catalytic dehydrogenation of primary alcohols to the corresponding aldehydes and esters is well known to the art. The usual catalyst is metallic copper. The production of esters requires incorporation in the catalyst of small amounts of rare metals such as cerium, zirconium and uranium.

In an effort to avoid the use of expensive and relatively unavailable catalysts, it has now been discovered that elemental sulphur will react with primary alcohols to produce esters.

The use to which the esters are best suited will depend, of course, upon the type produced. Quite often they are useful as intermediates for the preparation of other materials. The lower molecular weight esters are particularly useful as solvents for lacquers, cosmetics and the like, whereas the higher molecular weight esters are particularly useful as special purpose lubricants. If the esters are sufficiently high molecular weight, they may also be used as elastomers, and synthetic fibers.

Reactants

The process of this invention may be applied to any primary alcohol or any mixture of primary alcohols, including dihydric as well as monohydric alcohols. When applied to a dihydric alcohol, such as pentamethylene diol, there is a tendency to form multiple esters, or polymers. Such materials are suitable for use as lubricants, elastomers, synthetic fibers and the like.

Polyhydric alcohols having more than two hydroxy radicals may also be reacted in accordance with this invention, but the particular reaction of this invention apparently only takes place at hydroxy radicals attached to a primary carbon atom and therefore unless the structure is of a branched-chain variety, there can be no more than two hydroxy radicals attached to primary carbon atoms. Preferably, the principles of this invention are applied to straight-chained saturated alcohols, and preferably also to alcohols containing but a single hydroxy group, attached to a primary carbon atom. The principles of this invention may, however, be applied to branched-chain primary alcohols, such as isobutyl alcohol and their application thereto is in no way excluded from the broader scope of this invention.

Consider for the moment only the preferred type of alcohols, namely, the monohydric, straight-chained, primary alcohols, if methyl alcohol is used, the conversion to methyl formate is relatively poor. If ethyl alcohol is used, the conversion is much better and reasonable yields are obtained with alcohols up to and including 1-decanol. Above 1-decanol, esters are still formed, but the yields become progressively less. However, by adjusting the reaction conditions, particularly including the time of reaction and the temperature, it is believed that these yields can be improved. Milder temperatures and longer reaction times appear to be indicated.

The preferred alcohol material is therefore a primary, monohydric, straight-chained saturated alcohol containing not less than two nor more than ten carbon atoms per molecule or a mixture predominantly comprised of such alcohols.

The sulphur which enters into the reaction is preferably used in a powdered form, that is, as flowers of sulphur.

Reaction conditions

The reaction will normally be accomplished in a closed system under a pressure sufficient to maintain the reactants, and the ester formed by the reaction, in a liquid state. It will normally not be high enough to liquefy the hydrogen sulphide produced in the course of the reaction. The reaction can be accomplished at atmospheric pressure or below, but it is generally desirable, from a commercial standpoint to use a pressure high enough to keep the reactants and the ester in liquid state.

The temperature and the reaction time are interrelated as is usually the case in chemical reactions. It appears that any temperature between 200° C. and 600° C. can be used if the reaction time is adjusted accordingly.

The preferred temperature range appears to be from about 260° C. to about 325° C. The time of the reaction is usually from about 1 to about 4 hours. Ordinarily, the greater the molecular weight of the alcohol or mixture of alcohols, the lower will be the temperature used. Thus, with ethyl alcohol, 300° C. to 310° C. produces good yields, while with butyl alcohol 280° C. to 290° C. produces good yields and with decanol temperatures as low as 260° C. or even somewhat lower can be desirably used.

The proportions of reactants do not appear to be critical. Since the sulphur is converted into hydrogen sulphide by the reaction, it is desirable to use at least enough sulphur to convert all of the alcohol into ester. A lesser amount of sulphur converts only part of the alcohol into ester and when a greater amount is used, the excess simply remains in the product and must be subsequently removed. In general, therefore, one to one and one-half atomic weights of sulphur will be used for each one mol of alcohol.

At the end of the esterification reaction the esters may be separated from unreacted alcohol and high boiling residues by fractional distillation. Since these esters are easily hydrolyzed to the corresponding fatty acids, the reaction of alcohols with sulphur represents a potential source of these acids and derivatives such as the amides, anilides, etc.

The reaction is apparently expressed by the following equation:

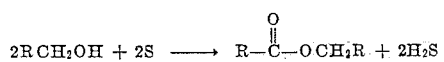

Further details and advantages of this invention will be apparent by consideration of the following specific examples:

*Example I*

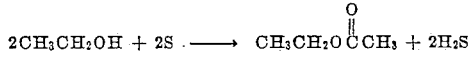

460 g. (10 moles) of ethyl alcohol and 320 g. (10 g. atomic wts.) of sulfur were heated in a 3 liter stainless steel bomb at 300–310° C. for 4 hours. Distillation of the liquid product yielded a fraction, 227 g., boiling at 68–73° C. Analysis by infra-red absorption and mass spectrometer showed the following composition:

68.4% ethyl acetate
19.4% ethyl alcohol
2.7% ethyl mercaptan
9.5% ethyl sulfide

*Example II*

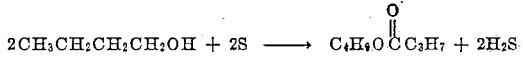

7.40 g. (10 mols) of n-butyl alcohol were heated with 320 g. (10 gram atomic wts.) of sulfur in a 3 liter stainless steel bomb at 280–290° C. for 3 hours. Distillation of the liquid product yielded 225 g. of butyl butanoate boiling at 162–164°. About 250 g. of unchanged butyl alcohol was recovered during the distillation.

The conversion to esters by means of reaction with elemental sulfur appears to be a general reaction of primary alcohols. Side reactions cause a lowering of yields with higher molecular weight alcohol, but there is still obtained with 1-decanol a 16% yield of decyl decanoate. By the use of milder reaction conditions the yield of long chained esters should be increased.

While it is desirable to use some pressure in the reaction, a single continuous run at atmospheric pressure and at 480° C. yielded a 4.5% conversion of ethyl alcohol, of which one-third was a conversion to ethyl acetate.

While esters of alcohols having ten or less carbon atoms have been more specifically discussed above, it is to be understood that this invention also includes the formation of esters from alcohols having a greater number of carbon atoms. Such esters containing from about 20 to 30 carbon atoms per molecule are particularly useful as special purpose lubricants and addition agents for mineral lubricating oils, and can be prepared by the process described, in somewhat lower yields.

What is claimed is:

1. A process for the production of organic esters, which comprises reacting a saturated, aliphatic, primary alcohol free from carbocyclic substituents, with elemental sulfur, at a temperature falling within the range varying between about 200° C. and about 600° C., and for a period of time sufficient to effect conversion to the corresponding organic ester.

2. A process for the production of organic esters, which comprises reacting a saturated, aliphatic, primary alcohol free from carbocyclic substituents, with elemental sulfur, at a temperature falling within the range varying between about 260° C. and about 325° C., and for a period of time sufficient to effect conversion to the corresponding organic ester.

3. A process for the production of organic esters, which comprises reacting a saturated, aliphatic, primary alcohol free from carbocyclic substituents, with elemental sulfur, in a ratio of at least about one mole of sulfur for each mole of said alcohol, at a temperature falling within the range varying between about 200° C. and about 600° C., and for a period of time sufficient to effect conversion to the corresponding organic ester.

4. A process for the production of organic esters, which comprises reacting a saturated, aliphatic, primary alcohol free from carbocyclic substituents, with elemental sulfur, in a ratio of at least about one mole of sulfur for each mole of said alcohol, at a temperature falling within the range varying between about 260° C. and about 325° C., and for a period of time varying between about one hour and about four hours.

5. A process for the production of organic esters, which comprises reacting a branched-chain saturated, aliphatic, primary alcohol with elemental sulfur, in a ratio of at least about one mole of sulfur for each mole of said alcohol, at a temperature falling within the range varying between about 200° C. and about 600° C., and for a period of time sufficient to effect conversion to the corresponding organic ester.

6. A process for the production of organic esters, which comprises reacting a straight-chained, saturated, aliphatic, primary alcohol with elemental sulfur, in a ratio of at least about one mole of sulfur for each mole of said alcohol, at a temperature falling within the range varying between about 200° C. and about 600° C., and for a period of time sufficient to effect conversion to the corresponding organic ester.

7. A process for the production of organic esters, which comprises reacting a straight-chained, saturated, monohydric, aliphatic primary alcohol containing from two to ten carbon atoms per molecule, with elemental sulfur, in a ratio of at least about one mole of sulfur for each mole of said alcohol, at a temperature falling within the range varying between about 260° C. and about 325° C., and for a period of time varying between about one hour and about four hours.

8. A process for the production of ethyl acetate, which comprises heating ethyl alcohol and elemental sulfur, in a ratio of at least about one mole of sulfur for each mole of ethanol, at a temperature falling within the range varying between about 260° C. and about 325° C., and for a period of time varying between about one hour and about four hours.

9. A process for the production of butyl butanoate, which comprises reacting butanol with elemental sulfur, in a ratio of at least about one mole of sulfur for each mole of butanol, at a temperature falling within the range varying between about 260° C. and about 325° C., and for a period of time varying between about one hour and about four hours.

AARON W. HORTON.

REFERENCES CITED

The following references are of record in the file of this patent:

Plattner: Die Chemie, vol. 55, pages 131–137 (1942).

Certificate of Correction

Patent No. 2,522,676 September 19, 1950

AARON W. HORTON

It is hereby certified that error appears in the printed specification of the above numbered patent requiring correction as follows:

Column 3, line 32, for "7.40 g." read *740 g.*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*